US006317691B1

(12) United States Patent
Narayan et al.

(10) Patent No.: US 6,317,691 B1
(45) Date of Patent: Nov. 13, 2001

(54) COLLISION AVOIDANCE SYSTEM UTILIZING MACHINE VISION TAILLIGHT TRACKING

(75) Inventors: Srinivasa Narayan, Moorpark; Yuri Owechko, Newbury Park, both of CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/504,634

(22) Filed: Feb. 16, 2000

(51) Int. Cl.[7] .......................... G06F 15/50
(52) U.S. Cl. .......................... 701/301; 701/28
(58) Field of Search .......................... 701/45, 300, 301, 701/28, 117; 382/171, 168, 170; 340/963, 961, 436

(56) References Cited

U.S. PATENT DOCUMENTS 6,151,539 * 11/2000 Bergholz et al. .......................... 701/25
6,246,961 * 6/2001 Sasaki et al. .......................... 701/301

* cited by examiner

*Primary Examiner*—William A. Cuchlinski, Jr.
*Assistant Examiner*—Marthe Marc-Coleman
(74) *Attorney, Agent, or Firm*—Tope-McKay & Associates; Cary Tope-McKay; Gentle E. Wing

(57) ABSTRACT

A vehicle-mounted sensing method and apparatus capable of monitoring the relative speed, distance, and closure rate between a sensor-equipped host vehicle and a sensed target object. The sensor uses an electronic camera to passively collect information and to provide the information to a system that identifies objects of interest using visual clues such as color, shape, and symmetry. The object's proximity may be determined, to a first approximation, by taking advantage of symmetrical relationships inherent in the vehicle of interest. The method and apparatus are particularly well-suited vehicular safety systems to provide for optimal risk assessment and deployment of multiple safety systems.

14 Claims, 8 Drawing Sheets

5b

5a

COLLISION AVOIDANCE SYSTEM UTILIZING MACHINE VISION TAILLIGHT TRACKING

TECHNICAL FIELD

The present invention relates to a method and an apparatus for enhancing vehicle safety utilizing machine vision to inform vehicle occupants and vehicle systems when a collision is likely to occur. Ideally, the system will notify the driver to take corrective action. In situations where collisions are inevitable, the system can facilitate smart airbag deployment as well as provide input to other vehicle safety systems.

BACKGROUND OF THE INVENTION

Many vehicle collisions occur every year, often causing bodily injury and extensive property damage. Some of these collisions result from inattentive drivers who fail to stop quickly enough when traffic stops. Particularly dangerous conditions exist at night, when drivers are more prone to fatigue and the ability to judge distances is impaired. The ability to judge distance depends, in part, on spatial clues, many of which are obscured by darkness. Adverse whether conditions may similarly obscure spatial clues and impair depth perception. Additionally, congested traffic, with its typical stop and go character, and close vehicle proximities, requires the driver to maintain a constant level of heightened alertness. Even a momentary lapse in attention can result in an collision.

In situations where collisions are inevitable, some automotive systems can be configured to minimize the potential for injury and loss of life. The airbag is an example of one such system. If the type and severity of the collision can be predicted, even to a first approximation, before the collision actually occurs, the airbags can be configured for optimal response. Parameters subject to configuration may include the rate and extent of airbag inflation.

To reduce the seriousness and number of collisions resulting from operator error, ranging sensors have been employed to collect external data and to provide timely warnings to vehicle occupants. Most ranging sensors utilized in collision avoidance include a transmitting portion and a receiving portion. The transmitting portion sends a signal from the sensor-equipped vehicle, or host vehicle, to a target vehicle. The target vehicle serves as a reflector, returning a portion of the transmitted signal to the receiving portion. The delay between the transmission and the reception of the reflected signal provides data pertaining to inter-vehicle distance and relative vehicle dynamics. This type of sensing system will be termed an interrogation/reflection system herein, and usually comes in one of two general types; either a radar-based system that transmits and receives radio waves, or a laser-based system that transmits and receives coherent light instead of radio waves. Both radar and laser-based systems are very costly and, as such, are not affordable to many consumers. Additionally, both systems have certain drawbacks. For instance radar-based interrogation/reflection systems need to be monitored and periodically maintained. A poorly maintained transmitting element, or mismatched antenna, may result in a portion of the transmission signal being reflected back into the transmitter, potentially causing damage. Electromagnetic pollution is another shortcoming common to most radar-based interrogation/reflection systems. There are a finite number of radio frequencies available, and as the number of frequency-requiring devices increases, so does the likelihood of false alarms caused by spurious signals originating from devices using neighboring frequencies or by inadequately shielded devices operating on distant frequencies, but manifesting harmonics within the operational frequencies of the receiving apparatus. Laser-based systems have attempted to overcome the problems associated with the overcrowded radio spectrum by using coherent light instead of radio signals. Although laser-based systems sufficiently overcome some of the problems associated with radio-based signals, they have other significant limitations. For example, precise mounting and alignment, while required in many interrogation/reflection systems, are especially important in laser-based systems. Failure to properly align a laser can result in the transmitted signal either being dissipated in space, or reflecting off an unintended object. Furthermore, lasers, because of their characteristic coherent nature are dangerous if directed into the eye. The risk is most acute with higher-powered lasers, or lasers operating outside of the visible spectrum.

SUMMARY OF THE INVENTION

The present invention relates to a method and an apparatus for enhancing vehicle safety utilizing machine vision to warn vehicle occupants and vehicle systems when an collision is likely to occur. In the ideal situation the system will issue a warning in time for the driver to take remedial action. In situations where collisions are inevitable, the invention can facilitate smart airbag deployment by providing information regarding to the expected severity of the crash. The invention can also provide data to other vehicle safety systems.

One embodiment of the present invention includes an apparatus for collision avoidance utilizing taillight tracking comprising at least one sensor for providing data, wherein the at least one sensor includes an image sensor having front and a lens for gathering image data, said lens including a focal axis, and said image data including color image components. The apparatus further includes a data processing device operatively connected with the at least one sensor to receive and process data therefrom, wherein said data processing device includes a means for isolating the colored image components from the image data and a means for performing a dilation and size filtering operation on the colored image components to provide selectively enhanced color image components. Further, the data processing device includes a means for identifying taillight pairs in the selectively enhanced color image components using a one-dimensional limited horizontal shift autocorrelation, with each of the identified taillight pairs having a taillight separation and a means for using the taillight separation of each of the identified taillight pairs to determine the value of the distance of each of the taillight pairs from the image sensor. The data processing device additionally includes a means for determining the taillight pair most aligned with the focal axis of the lens and in front to the image sensor; and a means for controlling the means set forth hereinabove of the present section. Wherein this last means generates, over time, a plurality of values of the distance from the image sensor to the taillight pair most aligned with the focal axis of the lens and in front to the image sensor, said values including a first most recent value and a second most recent value. The data processor additionally includes a means for storing the first most recent value and the second most recent value of the distance from the image sensor to the taillight pair most aligned with the focal axis of the lens and in front of the image sensor; and the data processor also includes a means for comparing the first most recent value and the second most recent value of the distance from the image sensor to the taillight pair most aligned with the focal axis of the lens and in front to the image sensor to determine the value of the rate-of-closure therebetween. There is also a safety system functionally connected with the data processing device, wherein said safety system is configured to receive the value of the rate-of-closure between the image sensor and the taillight pair most aligned with the focal axis of the lens and in front to the image sensor, and to activate when the value of the rate of closure exceeds a threshold value. While the apparatus has been described in general terms it is anticipated that one possible embodiment of the present invention would utilize a CMOS or CCD electronic camera as the image sensor and that at least one sensor will provide information to the data processor via a wireless interface. Further, it is anticipated that the data processor may provide an output through a wireless interface.

In another embodiment of the present invention a method for predicting rear-end collisions comprising the steps of collecting data using at least one sensor, wherein the at least one sensor includes an image sensor having a front and a lens for gathering image data, said lens including a focal axis, and said image data including color image components. Wherein the image is supplied to a data processor, for processing. Wherein the data in the data processor, processes the data by sub-steps including isolating the color image components from the image data, performing a dilation and size filtering operation on the color image components to provide selectively enhanced color image components. The selectively enhanced image components are then used as the basis for identifying taillight pairs using a one-dimensional limited horizontal shift autocorrelation, with each of the identified taillight pairs having a taillight separation. The taillight separation of each of the identified taillight pairs is used to determine the value of the distance of each of the taillight pairs from the image sensor. Next the taillight pair most aligned with the focal axis of the lens, and in front of the image sensor is determined. The above sub-steps are controlled to generate, over time, a plurality of values of the distance from the image sensor to the taillight pair most aligned with the focal axis of the lens and in front to the image sensor, said values including a first most recent value and a second most recent value. Next the first most recent value and the second most recent value of the distance from the image sensor to the taillight pair most aligned with the focal axis of the lens, and in front to the image sensor, are stored. They are then compared to the first most recent value and the second most recent value of the distance from the image sensor to the taillight pair most aligned with the focal axis of the lens, and in front of the image sensor, and are used to determine the value of the rate-of-closure therebetween. The data processor is functionally connected with a safety system, wherein said safety system receives, from the data processor, the value of the rate-of-closure between the image sensor and the taillight pair most aligned with the focal axis of the lens and in front of the image sensor, said safety system being activated when the value of the rate-of-closure exceeds a threshold value.

DESCRIPTION OF THE PREFERRED EMBODIMENTS

Figure 1:
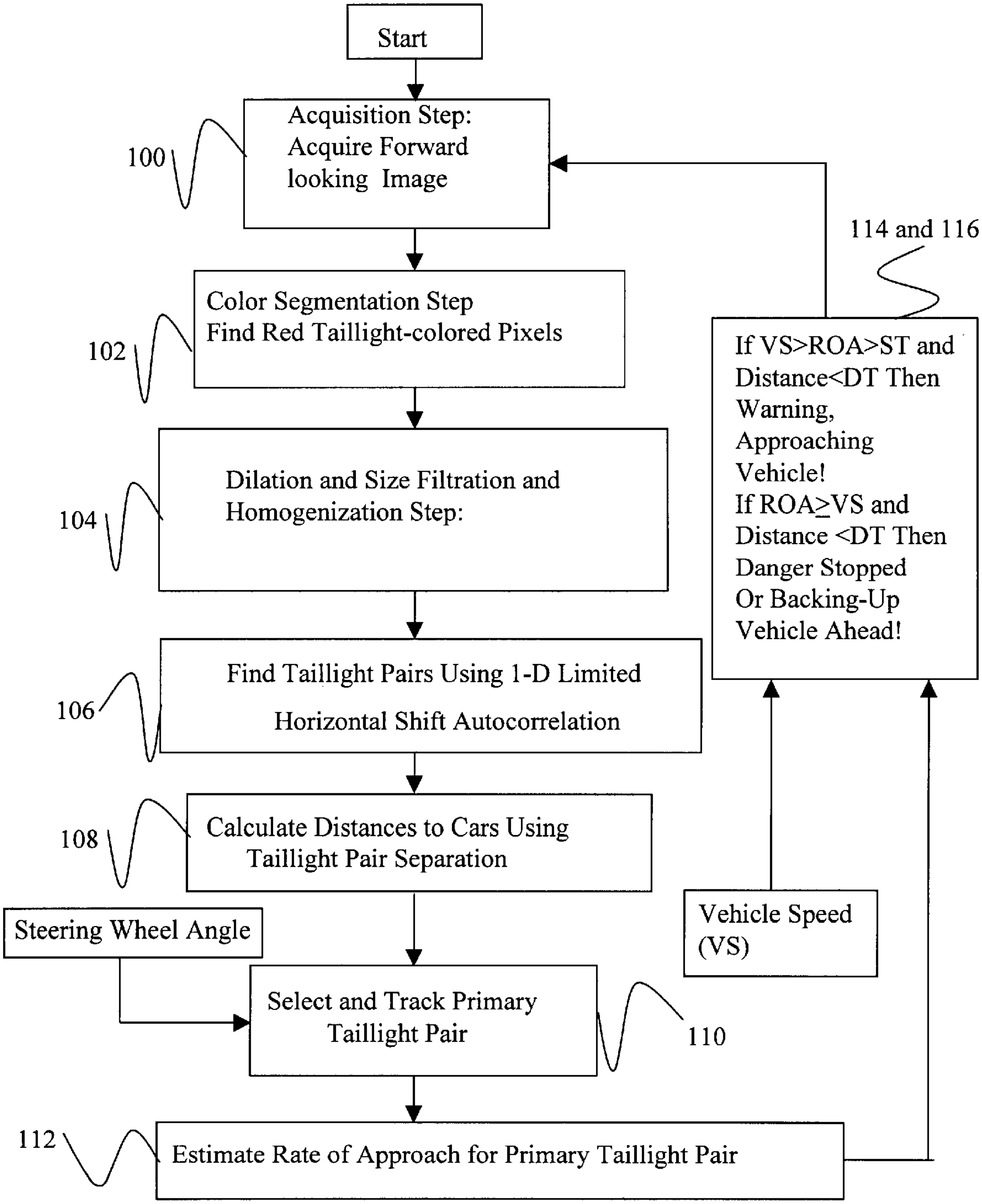
FIG. 1 shows a flowchart of one embodiment of the collision avoidance system in operation.

The present invention is useful for collision prediction and avoidance, and may be tailored to a variety of other applications. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Some portions of the detailed description are presented in terms of a sequence of events and symbolic representations of operations on data within electronic memory. These sequential descriptions and representations are the means used by those skilled in the art to most effectively convey the substance of their work to others skilled in the art. The sequential steps are generally those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals by terms such as values, components or elements.

Unless specifically stated otherwise as apparent from the following discussions, it is appreciated that throughout the present disclosure, discussions utilizing terms such as "processing", "calculating", or "determining" refer to the action and processes of a computer system, or similar electronic device that manipulates and transforms data represented as physical, especially electronic quantities within the system's registers and memories into other data similarly represented as physical quantities within the system memories or registers or other such information storage, transmission, or output devices.

One embodiment of the present invention relates to method for monitoring the dynamics of, and predicting collisions between, a host vehicle with a sensor and at least one object in the area surrounding the host vehicle. The host vehicle could, as a non-limiting example, be an automobile and the object could be another vehicle, a traffic sign, another object, or plurality of objects. The host vehicle's sensors collect and convey data to a processor; the processor isolates indicia unique to the objects of interest. Possible indicia screened for include such features as shapes, patterns, and colors unique to the object or objects of potential interest. For instance, a red octagon could serve as a somewhat unique feature to assist in the identification of a stop sign.

The processor uses a computationally simple filtering method to identify the candidate objects, i.e. those objects having features that are common to the objects of interest. Since it is unlikely that every candidate object identified will be an object of interest, additional filtration will generally be required. Such filtration ideally determines which of the identified candidate objects is of most immediate interest to the host object. This determination may be based on the relative positions of the candidate and host objects. To illustrate, if both the host and candidate objects are automobiles, the criteria used in selecting which candidate automobile will constitute the target automobile might be based on the degree to which the potential target automobiles are in the path of the host automobile. After the target automobile is identified, its proximity to the host automobile is determined. In one embodiment of the present invention, the proximity determination is based upon the assumed constant separation of the automobile taillights. However, any property inherent in the object of interest, coupled with a correction factor or a mathematical relationship could be used with good results. For instance, in the case of a stop sign, the vertical distance from the top to the bottom of the sign could be used. By monitoring changes in distance as a function of time between the host object and the object of interest, the processor can alert the operator or vehicle systems of potentially dangerous situations. Non-limiting examples of such situations could include predicted automotive collisions, or a high rate of closure coupled with an intersection marked with a stop sign.

FIG. 1 depicts a functional flowchart of one embodiment of the present invention, specifically as applied to trucks, cars, and similar vehicles. First, an acquisition step 100 is performed, whereby a color camera such as a CMOS or CCD camera acquires a forward-looking color image. The camera, preferably, should be able to differentiate between different wavelengths in the electromagnetic spectrum, particularly the visible and infrared regions. Furthermore the camera should be able to withstand the heat and vibration normally encountered within a vehicle. In a color segmentation step 102, the image gathered in the acquisition step 100 is transmitted to a computer, and the computer performs a color segmentation operation 102. In this operation, the image is filtered so that only pixels from a designated portion, or designated portions, of the spectrum, termed herein as the pass spectrum, are subjected to further processing. The designated pass spectrum in one embodiment might, for example, be an 80 nm range centered at 645 nm. Pixels found to be within the pass spectrum are designated as candidate regions, and are subjected to a dilation and homogenization step 104. This step is designed to homogenize any textural or design elements in the taillight. Without the dilation and homogenization step 104, such elements could result in isolated regions of chromatic inhomogeneities within the taillight image. The purpose of the dilation is to merge any chromatic inhomogeneities found within the taillight.

Next is a taillight identification step 106. In this step, a size filter selects regions having a size range consistent with what would be expected for taillights within the range of distances of interest. The distances of interest will vary depending on vehicle speed, among other factors. In one example the system might rely on the vehicle speed and expected stopping time as a criteria for setting an upper limit for distance of interest. A variety of low-complexity size filters may be used to perform the size filtration step 106. One such filter could be a wavelet-based scale filter, whereby a wavelet transform is performed on the remaining image components, and all elements not within a predetermined size range are set to zero. At the end of the size-filtering step, all that remains of the initial image is a set of candidate objects having color and size consistent with taillights over a designated range of distances. The final determination is then made as to which objects in the image are taillight pairs. This is accomplished by taking advantage of the fact that taillights exist in horizontally separated, symmetrical pairs. In the event that the road is banked, it is assumed that both the target vehicle and the host vehicle are on approximately the same bank, and thus from the frame of reference of the system the taillights of the target vehicle are still significantly horizontal. In order to determine which objects in the image are taillight pairs, the following procedure is followed. First, each potential taillight object is normalized by its area. Second each normalized potential taillight object is then reflected about its vertical centerline, and correlated horizontally against the other objects in the same vertical position. The horizontal correlation shifts are performed over a limited range, based on the expected taillight separation. If the resultant normalized correlation peak exceeds a predetermined threshold, the candidate object is labeled as a taillight pair. This step has low computational requirements because the correlation is one-dimensional and the correlation shifts do not extend over the entire image. The presence of a third taillight, as is located midway between the horizontal taillight pair of some vehicles, and shifted upward relative to the horizontal taillight pair, could serve as an optional confirmatory feature for recognition of taillights. At the end of the taillight determination step 106, the taillight pairs in the image have been isolated. The next step is a proximity determination step 108. The proximity of the host vehicle to potential target vehicle is determined by assuming that taillight separation is essentially invariant from vehicle to vehicle. This assumption allows for the calculation of the distance between the potential target vehicle and the host vehicle based on the apparent separation of the potential target vehicle's taillight pair. Implementation of the proximity determination step 108 can be accomplished in a variety of ways. One method for accomplishing the proximity determination step 108 involves measuring the apparent separation between taillights in the sensor image. The apparent taillight separation, used in conjunction with the known focal length of the sensor lens, allows for the calculation of the angle subtended by a taillight pair. Knowing the approximate actual separation between a matched taillight pair and knowing the subtended angle, allows for the geometric determination of the range to the taillight pair.

An alternative technique establishes a functional relationship between apparent separation and proximity. Thus, the distance of the target-vehicle-taillights to the camera, D, is determined by multiplying the apparent separation, $A_S$, by an empirically determined correction factor, $\alpha$. The empirically determined correction factor, $\alpha$, is determined by measuring the actual distance, $D_I$, for a specific apparent separation, $A_{SI}$ and then multiplying the specific apparent separation, $A_{SI}$, by the actual measured distance, $D_I$.

Thus:

$$\alpha = A_{SI} D_I$$

The actual distance is then calculated according to the equation:

$$D = \alpha / A_S$$

where:

D is the distance from the target-vehicle's taillights to the camera;

$\alpha$ is an empirically determined correction constant; and $A_S$ is the apparent taillight separation, from the point of view of the camera.

The accuracy of this method is reduced for distances, D, which are approximately equal to or smaller than the focal length of the sensor lens. This inaccuracy is small, however, and of little consequence for the ranges of interest in taillight tracking. In the target vehicle identification step 110 the taillight pair most near, and most immediately ahead of the sensor-equipped host vehicle is identified. The identification is achieved by evaluating a portion of the image corresponding to the scene directly in front of the host vehicle, identifying the closest taillight pair, according taillight separation, and designating that particular taillight pair as the taillight pair of the target vehicle. Other vehicles both to the left and right of the target vehicle are ignored because they are not in the path of the sensor-equipped host vehicle. Similarly, candidate taillight pairs, which do not lie on lines of projection from the horizon to the sensor, can be ignored since they do not lie on the path of the host vehicle. Such taillight pairs may, for example, correspond to vehicles on a billboard, overpass, or on top of a car transporter. The target vehicle identification step 110 includes a tracking operation, which takes advantage of the fact that changes in following distances must occur relatively smoothly. The next step is a rate of closure determination step 112, the distance to the nearest taillight pair ahead of the host vehicle is measured at regular intervals. Using the distance measurements, the rate of closure (ROC) can be continuously monitored and the appropriate response can be initiated if the rate of closure exceeds the predetermined threshold value. The system's robustness is enhanced because the system continually monitors the separation between the host vehicle and target vehicle. If the separation is measured as essentially constant, or varying only slightly for a number of images, followed by a sudden and transient spike in the measured vehicle separation, the spike may be considered as spurious and omitted. Both the rate of closure determination step 112 and target vehicle identification step 110 consider the aspect ratio of the taillights. Taillights having a horizontal member will be measured from their most distant edges. Circular taillights will be measured from their centers, and if multiple sets of taillights are present on the same vehicle, the outermost set of taillights will be selected for tracking, as it will appear to be the nearest set of taillights. In some situations, when the taillight is turned on, the apparent separation of the taillights will change. This is most common when there is particulate in the air. The apparent change in separation can pose a problem if the apparent taillight separation changes. The problem with respect to circular taillights is largely addressed by considering the centermost portion of the taillight. In cases where the target vehicle is equipped with rectangular horizontal taillights, the apparent inter-vehicle separation may instantly change by a few percent. The tracking portion of the target vehicle identification step 110 will detect this spike and conclude that the separation between the host vehicle and the target vehicle instantly changed. This rapid, but limited, apparent change in separation will not necessarily trigger the warning alarm 114.

Decisions whether to warn the driver are made in the warning decision step 116, based on the current distance to the target vehicle, the rate of closure, and the speed of the host vehicle (VS). A speed threshold (ST), and distance threshold (DT), between the host vehicle and the target vehicle are defined either by operator-adjustable parameters, or by factory specified parameters. Examples of factory specified parameters include values derived from studies conducted on the basis of collision reports. If the rate of closure is greater than the speed threshold but less than the host vehicle speed, and the measured distance to the target vehicle is less than the distance threshold, then the system will alert the driver, warning that the closure rate is too high. If the rate of closure is greater or equal to the host vehicle speed and the distance is less than the distance threshold, then the system will warn the driver that a vehicle ahead is stopped or backing up.

While speed and steering wheel position sensors are not essential, they nicely augment the system. The speed sensor is particularly useful in situations where the distance threshold between the host vehicle and the target vehicle are adjusted based on the speed of the host vehicle. The steering wheel position sensor is most useful in situations where the road is curved. In such situations the target vehicle may not be the vehicle most nearly ahead of the host vehicle. Therefore, the steering wheel position sensor can be a useful aid in identifying target vehicles on curving roads. It is further anticipated that additional sensors could be incorporated, such as a thermometer that can detect when conditions are favorable for the formation of ice on the road and instruct the tracking operation to increase the distance threshold or decrease the speed threshold. It is worth noting that most vehicles of today are equipped with an array of sensors, many of which could provide data to the system. The means of providing the data could be a conventional physical interconnect, or alternatively it could be a wireless interface from the vehicle sensor to the system. Furthermore, some data could be transmitted to the vehicle from remote sensors such as satellite based global positioning.

In a completely integrated embodiment of the present invention, the vehicle's existing sensors, such as the speedometer, thermometer, and steering wheel position sensors could readily be adapted to provide the necessary sensory inputs, and the system could interact with other vehicle systems such as a smart airbag deployment system. Additionally, since the camera can be discretely mounted behind the rearview mirror, or in a similar, non-obtrusive location, the system will have minimal impact on vehicle styling.

In another embodiment, the processor of the present invention could be instructed to identify traffic control devices. For example, as previously mentioned, the semi-unique octagonal shape of a stop sign could serve as the basis for identification. Once identified, the processor could determine whether the driver was approaching the stop sign too rapidly. If rate of closure was in excess of the threshold parameter, the driver could be warned in a timely manner. The distance to the stop sign would be determined based on the apparent height or width of the stop sign.

It is noteworthy that the processor could be reprogrammed or swapped out, and the existing system could be used for a variety of other applications. For instance the rate of speed could be determined from the apparent speed that broken lane-separator lines pass into and out of the camera's field of view. This feature could be used to add robustness to the portable unit. Other electromagnetic spectrum components, including the infrared region, could also be used to isolate and identify vehicle components or objects.

Figure 2:
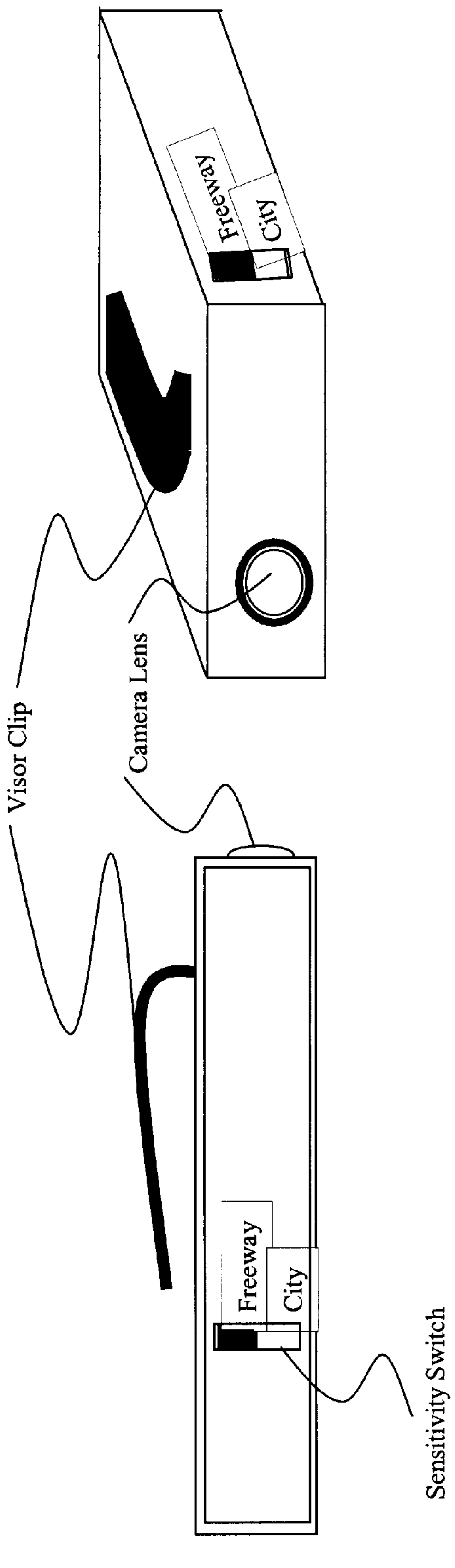
FIG. 2 depicts a completely self-contained embodiment of the collision avoidance system.

Another embodiment, incorporating a completely portable system, as shown in FIG. 2, does not depend on any vehicle sensors. Such a system, has the advantage of being portable, and thus can readily be carried by the driver and used in any vehicle. The portable system could be configured to warn the driver in situations where the host vehicle's rate of approach to a target vehicle exceeds a threshold value, or where the host vehicle is too near the target vehicle. Furthermore, the system could optionally have variable threshold settings. For example, there could be a set of threshold parameters suited for city driving, and a different set of threshold parameters for highway driving. The city driving threshold parameters could allow smaller vehicle separations to accommodate the realities of lower-speed traffic. The highway driving threshold parameters, by contrast, would be better suited the larger vehicle separations, and longer stopping distances indicated in free-way situations. Threshold parameters may also be customized to accommodate different stopping distances of individual vehicle classes. The driver could optionally select the threshold parameter selection. The portable unit could be a single self-contained apparatus that could be clipped to the sun-visor, the rearview mirror, and the top of the steering wheel, mounted to the windshield with the aid of suction cups, or otherwise positioned with an unobstructed forward view. It is also anticipated that the self-contained apparatus could incorporate a speed sensor based on a transmitted signal, either from a vehicle based system, or from a remote sensing system such as a satellite based global positioning system. The sensor inputs may be transmitted using a wireless interface a more conventional wired interface.

The steps represented in FIG. 1 by elements 100, 102, 104, 106, 108, 110, 112, 114 are shown in greater detail in FIGS. 3, 4, 5, 6, 7, and 8, and will be discussed below.

Figure 3:
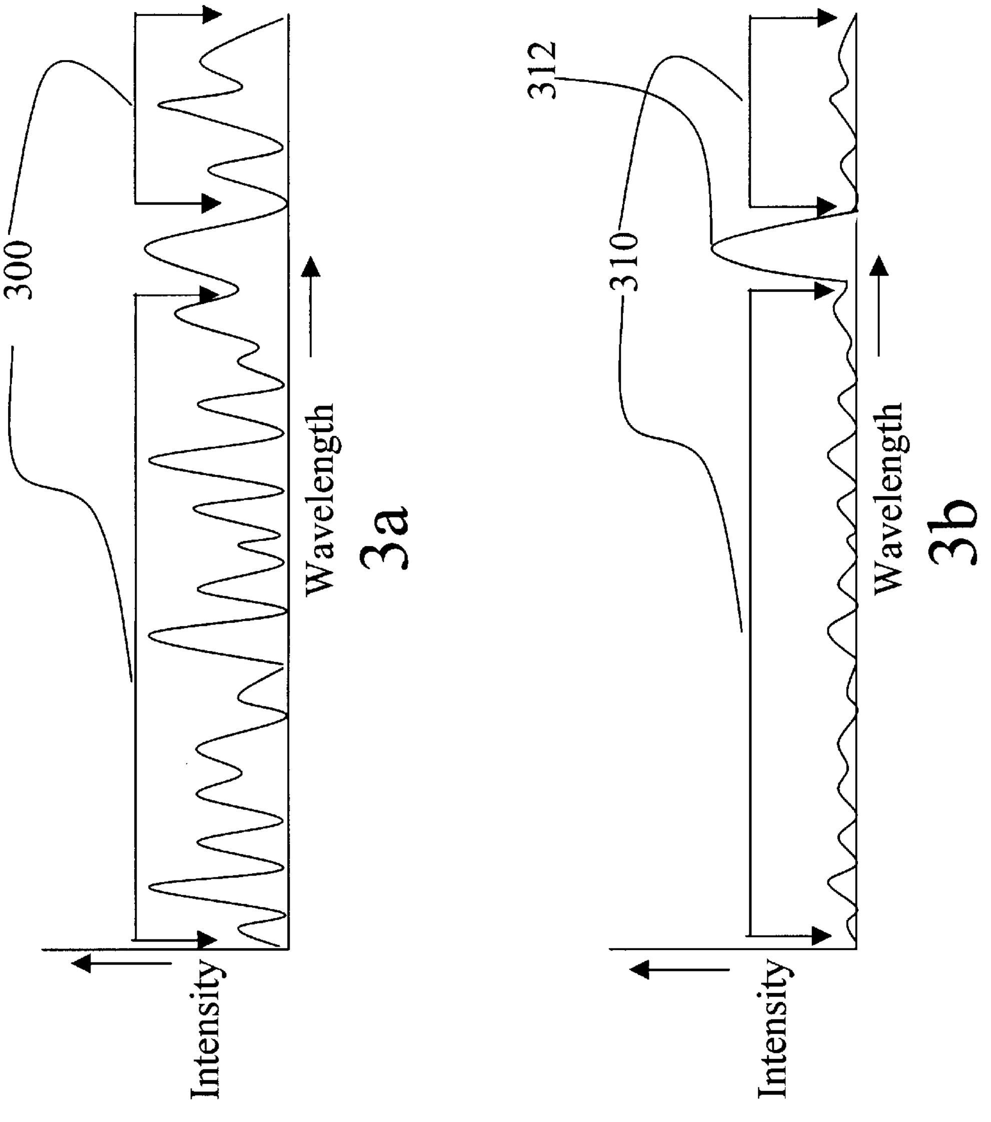
FIG. 3 shows an intensity versus wavelength plot, both before and after the color segmentation operation.

An example of the color segmentation operation 102 from FIG. 1 is shown greater detail in FIG. 3. The steps of the color segmentation operation 102 are substantially as follows. Initially the image is comprised of multiple elements, depicted on a wavelength-intensity plot FIG. 3*a*. This initial image is then filtered with the result depicted in FIG. 3*b*. In this filtering step, all colors not falling a within the predetermined range of wavelengths 300 are subtracted 310, in the aggregate; this is called the color segmentation operation 102. After the color segmentation operation 102 the taillight pair emerges with a significantly increased signal to noise ratio 312. In this step, all components within a designated wavelength spectrum are isolated and passed on for further processing.

Figure 4:
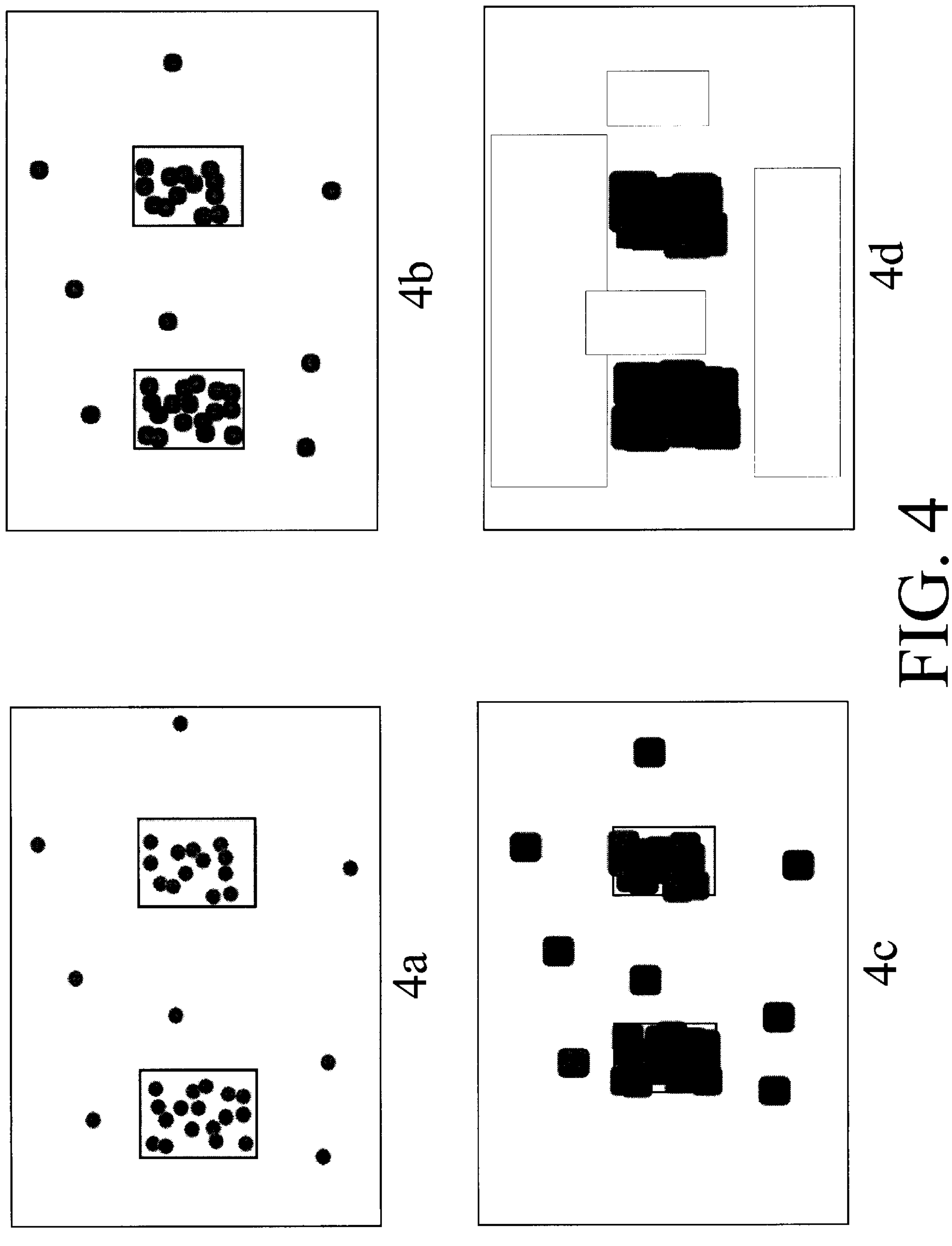
FIG. 4 illustrates the dilation and filtration operations.
Figure 5:
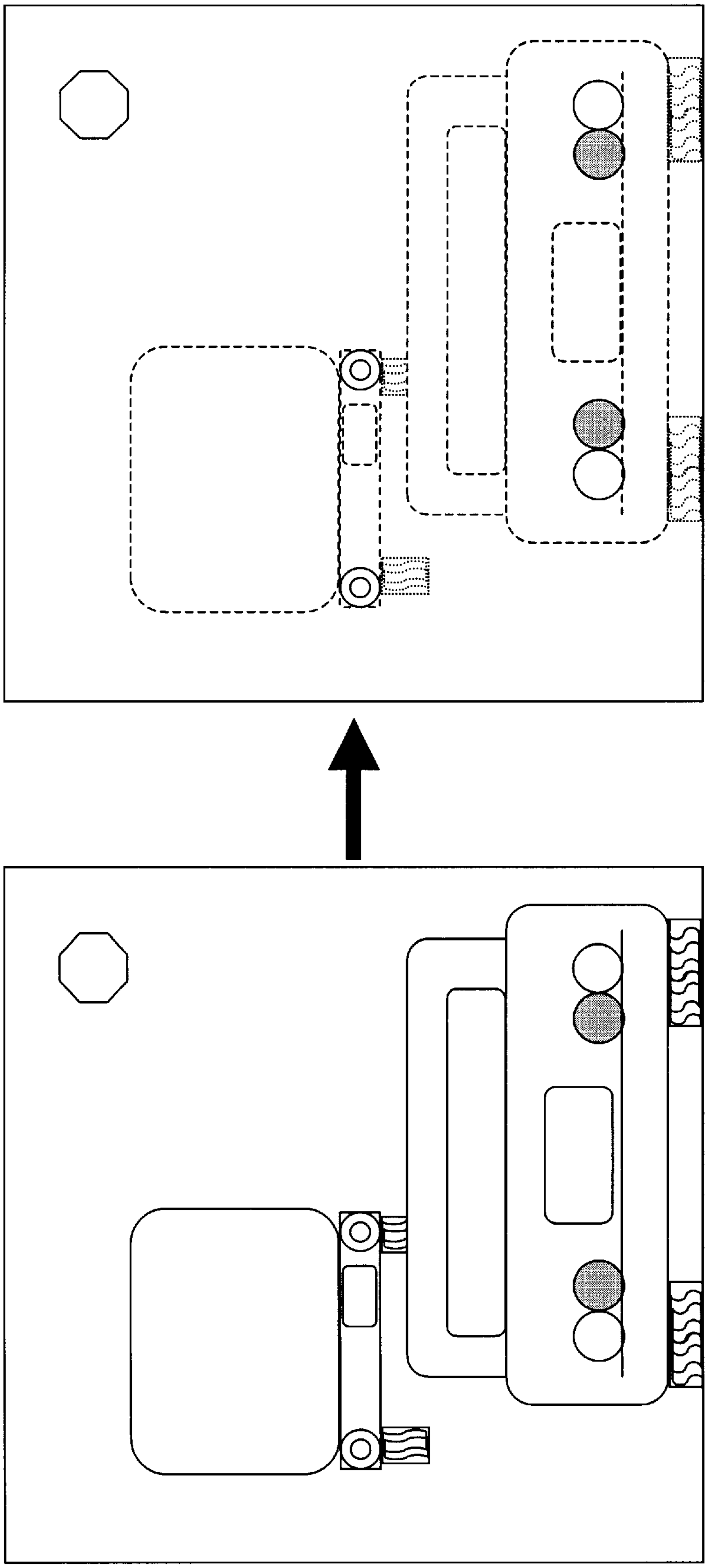
FIG. 5 shows the image subtraction operation where unwanted image components are subtracted.

In the dilation and homogenization step 104 the candidate regions are dilated as shown in FIG. 4 and filtered by size. This step is designed to homogenize any textural or design elements in the taillight. Without the dilation step, such elements could result in isolated regions of chromatic inhomogeneities within the taillight. The purpose of the dilation is to merge any chromatic inhomogeneities found within the taillight. FIG. 4 depicts an image as it is dilated and filtered. It should be understood that while multiple figures are included showing a gradual progression in the dilation step, this progression is for illustrative purposes and the actual number of steps in the dilation and filtration steps may vary. Furthermore the boxes bounding the taillight regions are included to assist in visualizing where the taillights are located during the dilation and filtration steps. In FIG. 4*a*, the initial image is depicted. The initial image may lack coherency for a number of reasons. These reasons include manufacturer's insignia marks on the taillight, textural elements, cracks or minor chips. FIG. 4*b* depicts a minor level of dilation. Such a level would be appropriate for largely coherent taillights. A greater level of dilation is depicted in FIG. 4*c* while FIG. 4*d* shows an additional level of dilation and the filtering step. The effect of the steps in FIG. 4 is to homogenize regions of chromatic inhomogeneity within the taillight portion of the image.

In the size-filtering portion of the taillight identification step 106, the size filter selects image components having a size range consistent with what would be expected for taillights within the range of distances of interest and rejects all other image components. The distances of interest will vary depending on vehicle speed, among other factors. As previously stated, the system might rely on the vehicle speed and expected stopping time as a criterion for setting a distance of interest. A variety of low-complexity size filters may be used to perform the size-filtering portion of the taillight identification step 106 of FIG. 1, as shown in FIGS. 5*a* and 5*b*. One such filter could be a wavelet-based scale filter, whereby a wavelet transform is performed on the image components, depicted in FIG. 5*a*, and all elements not within a predetermined size range are set to zero, as shown in FIG. 5*b*. At the end of the size-filtering step, all that remains of the initial image is a set of candidate objects having color and size consistent with taillights over a designated range of distances, as shown in FIG. 5*b*.

Figure 6:
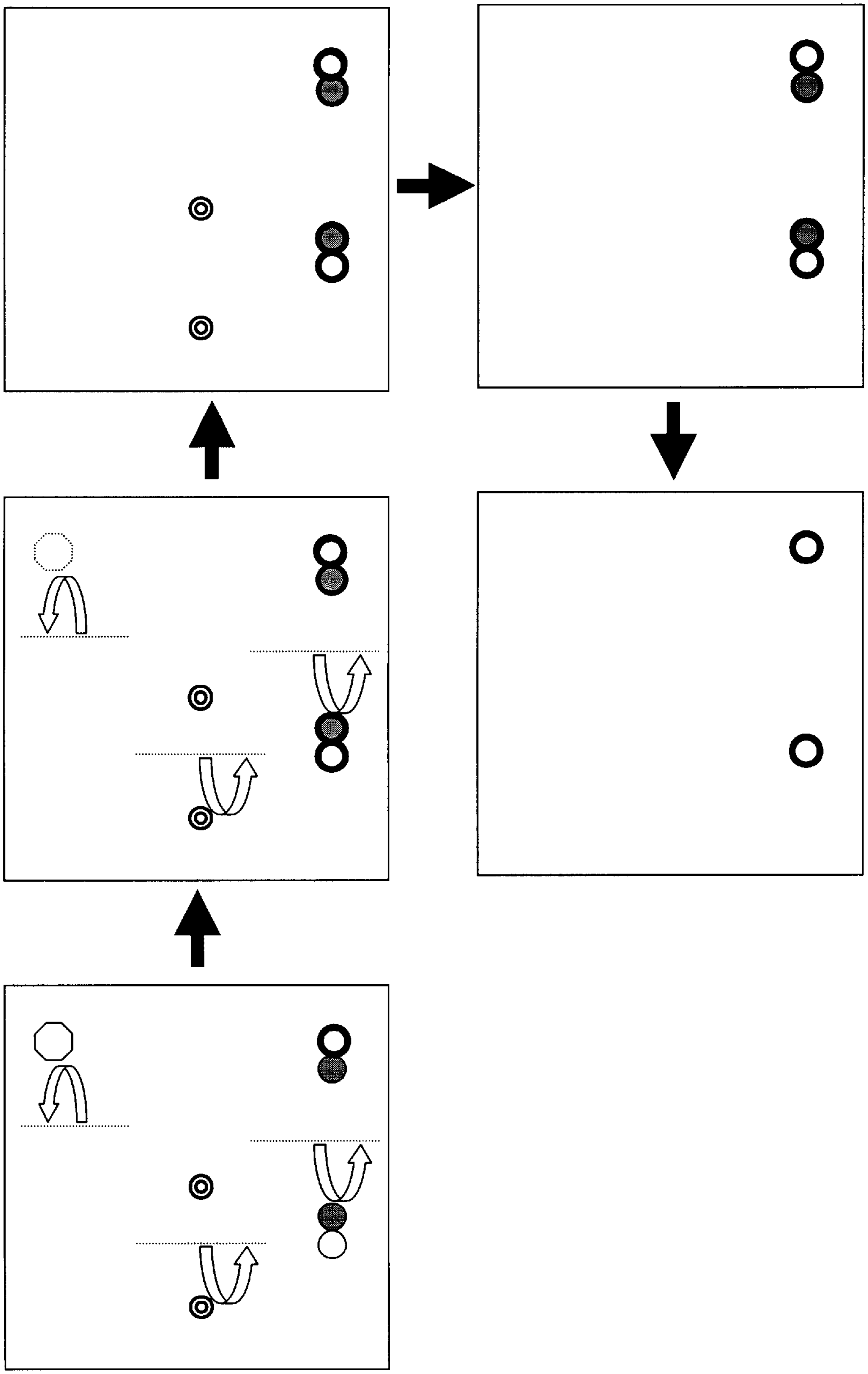
FIG. 6 shows a procedure for determining which objects in the image are taillight pairs

The procedure for determining which objects in the image are taillight pairs is shown in FIG. 6. First is a normalization step, depicted in FIG. 6*a*. In this step, each potential taillight object is normalized by its area. Second, in a vertical centerline reflection step shown in FIG. 6*b*, each normalized candidate object is reflected about its vertical centerline and correlated horizontally against the other objects in the same vertical plane. The horizontal correlation shifts are performed over a limited range based on the expected separation of taillights. Third, is the candidate thresholding step presented in FIG. 6*c*. If the normalized correlation peak exceeds a predetermined threshold, the candidate object is labeled as a taillight pair. This step has low computational requirements because the correlation is one-dimensional and the correlation shifts do not extend over the entire image. As stated previously, the presence of a third taillight, located midway between a horizontal taillight pair, and shifted upward relative to the horizontal taillight pair, could serve as an optional, confirmatory feature for recognition of taillights. Fourth, the target vehicle identification step 110 also shown in FIG. 6*d* identifies the taillight pair of the target vehicle by selecting the taillight pair most near and directly in front of the host vehicle. Fifth, the image subtraction step depicted by FIG. 6*e* subtracts all of the image components that are not the identified target pair of taillights.

Figure 7:
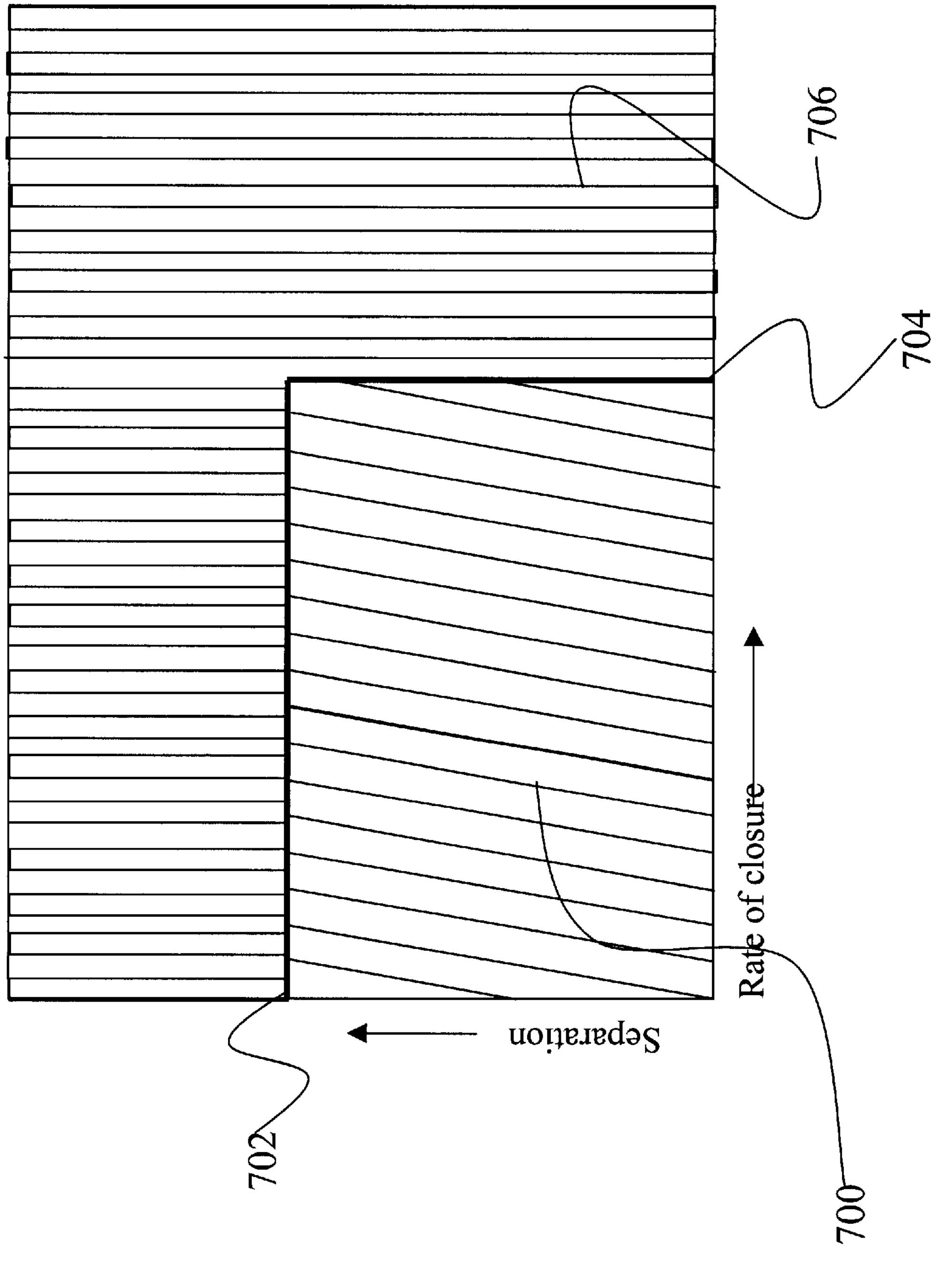
FIG. 7 depicts a chart showing an operating range wherein the system will continually sense and analyze data but will not sound an alarm.

Decisions whether to advise the driver are made in the warning criteria step 114 of FIG. 1, based on the current distance to the target vehicle and the rate of closure with the target vehicle. FIG. 7 depicts a chart showing an operating range 700 wherein the system will continually sense and analyze data but will not sound an alarm. At the boundaries of the operating range 700 are the distance threshold 702 and the closure rate threshold 704. Values outside the threshold boundaries 706 will trigger an alarm. The distance threshold 702, and closure rate threshold 704, between the host vehicle and the target vehicle are defined either by operator-adjustable parameters, or by factory-specified parameters. Examples of factory-specified parameters include values derived from case studies of collision scenarios.

Figure 8:
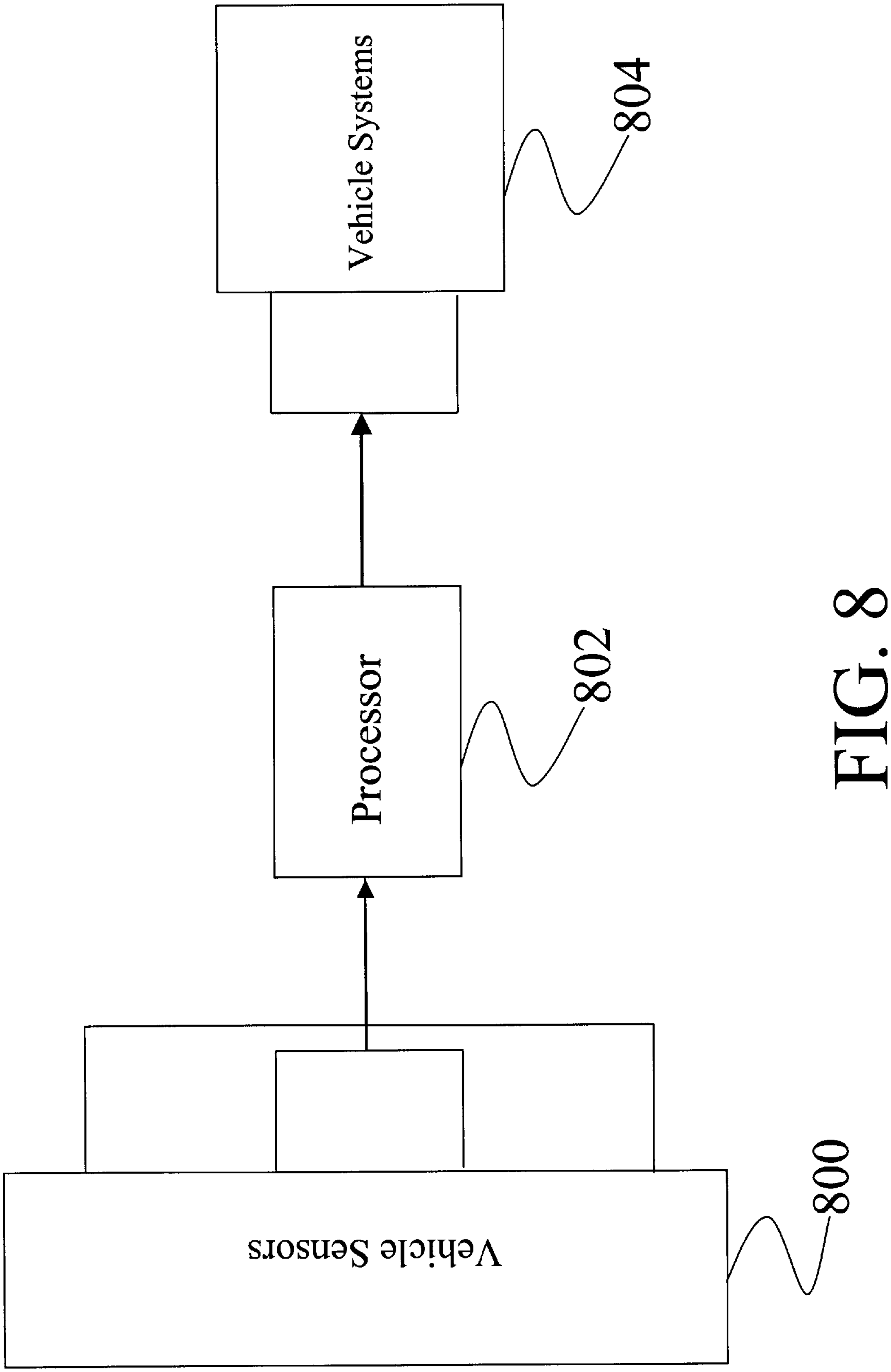
FIG. 8 shows how the vehicle's existing sensors, such as the speedometer, an external thermometer, and road sensor could provide the sensory inputs to the processor.

In a completely integrated embodiment of the present invention, diagrammed in FIG. 8, the vehicle's existing sensors 800, such as speedometer, external thermometer, road sensors etc., could all be readily adapted to provide the sensory inputs to the processor 802. The processor 802 could, in turn, interact with other vehicle systems 804 such as a smart airbag deployment system.

What is claimed is:

1. An apparatus for collision avoidance utilizing taillight tracking comprising:

a. at least one sensor for providing data, the at least one sensor including an image sensor having front and a lens for gathering image data, said lens including a focal axis, and said image data including color image components;

b. a data processing device operatively connected with the at least one sensor to receive and process data therefrom, said data processing device including:

i. means for isolating the colored image components from the image data;

ii. means for performing a dilation and size filtering operation on the colored image components to provide selectively enhanced color image components;

iii. means for identifying taillight pairs in the selectively enhanced color image components using a one-dimensional limited horizontal shift autocorrelation, with each of the identified taillight pairs having a taillight separation;

iv. means for using the taillight separation of each of the identified taillight pairs to determine a value of a distance of each of the taillight pairs from the image sensor;

v. means for determining the taillight pair most aligned with the focal axis of the lens and in front to the image sensor;

vi. means for controlling the means set forth in sub steps i to v of the present claim to generate, over time, a plurality of values of the distance from the image sensor to the taillight pair most aligned with the focal axis of the lens and in front to the image sensor, said values including a first most recent value and a second most recent value;

vii. means for storing the first most recent value and the second most recent value of the distance from the image sensor to the taillight pair most aligned with the focal axis of the lens and in front to the image sensor; and viii. means for comparing the first most recent value and the second most recent value of the distance from the image sensor to the taillight pair most aligned with the focal axis of the lens and in front to the image sensor to determine a value of a rate-of-closure therebetween; and c. a safety system functionally connected with the data processing device, said safety system configured to receive the value of the rate-of-closure between the image sensor and the taillight pair most aligned with the focal axis of the lens and in front to the image sensor, and to activate when the value of the rate of closure exceeds a threshold value.

2. An apparatus for collision avoidance utilizing taillight tracking as set forth in claim 1, wherein the image sensor is an electronic color camera and wherein the at least one sensor further includes a speed sensor and a steering wheel position sensor.

3. An apparatus for collision avoidance utilizing taillight tracking as set forth in claim 1, wherein the safety system includes at least one component selected from the group consisting of an output to an audio alarm, an output to a visual alarm, and an output to an airbag deployment algorithm.

4. An apparatus for collision avoidance utilizing taillight tracking as set forth in claim 1, wherein the safety system includes at least one component selected from the group consisting of an audio alarm having adjustable sound frequency and sound volume, a heads-up display, a LED, and a visual alarm including at least one flashing light.

5. An apparatus for collision avoidance utilizing taillight tracking as set forth in claim 1, wherein the image sensor is selected from the group consisting of a CCD color camera and a CMOS color camera.

6. An apparatus for collision avoidance utilizing taillight tracking as set forth in claim 1, wherein the apparatus is mounted inside a substantially rigid housing, the substantially rigid housing is adapted to be detachably attached within the passenger compartment of a vehicle.

7. An apparatus for collision avoidance utilizing taillight tracking as set forth in claim 6, wherein the substantially rigid housing is adapted for attachment near an internally mounted rearview mirror.

8. An apparatus for collision avoidance utilizing taillight tracking as set forth in claim 7, wherein the image sensor is selected from the group consisting of a CCD color camera and a CMOS color camera.

9. An apparatus for collision avoidance utilizing taillight tracking as set forth in claim 7, wherein the at least one sensor provides information to the data processor via a wireless interface.

10. An apparatus for collision avoidance utilizing taillight tracking as set forth in claim 6, wherein the image sensor is selected from the group consisting of a CCD color camera and a CMOS color camera.

11. An apparatus for collision avoidance utilizing taillight tracking as set forth in claim 1 wherein the at least one sensor provides information to the data processor via a wireless interface.

12. A method for predicting rear-end collisions comprising the steps of;

a. collecting data using at least one sensor, the at least one sensor including an image sensor having a front and a lens for gathering image data, said lens including a focal axis, and said image data including color image components;

b. providing said data to a data processor;

c. processing said data in the data processor by sub-steps including:

i. isolating the color image components from the image data;

ii. performing a dilation and size filtering operation on the color image components to provide selectively enhanced color image components;

iii. identifying taillight pairs in the selectively enhanced color image components using a one-dimensional limited horizontal shift autocorrelation, with each of the identified taillight pairs having a taillight separation;

iv. using the taillight separation of each of the identified taillight pairs to determine a value of a distance of each of the taillight pairs from the image sensor;

v. determining the taillight pair most aligned with the focal axis of the lens, and in front of the image sensor;

vi. controlling the sub-steps set forth in sub-steps i to v of the present claim to generate, over time, a plurality of values of the distance from the image sensor to the taillight pair most aligned with the focal axis of the lens and in front to the image sensor, said values including a first most recent value and a second most recent value;

vii. storing the first most recent value and the second most recent value of the distance from the image sensor to the taillight pair most aligned with the focal axis of the lens and in front to the image sensor; and viii. comparing the first most recent value and the second most recent value of the distance from the image sensor to the taillight pair most aligned with the focal axis of the lens and in front of the image sensor to determine the value of the rate-of-closure therebetween;

d. functionally connecting the data processor with a safety system, wherein said safety system receives, from the data processor, a value of a rate-of-closure between the image sensor and the taillight pair most aligned with the focal axis of the lens and in front of the image sensor, said safety system activating when the value of the rate-of-closure exceeds a threshold value.

13. A method for predicting rear-end collisions as set forth in claim 12, wherein the at least one sensor further includes at least one additional sensor selected from the group consisting of a speed sensor, a temperature sensor, and a steering wheel position sensor, and wherein the at least one additional sensor is used for collecting and providing additional data to the data processor, where said data processor further includes means for using the additional data to define the threshold value used in the activation of the safety system.

14. A method for predicting rear-end collisions as set forth in claim 13, wherein the step of providing the data to the processor is performed via a wireless interface.

* * * * *